US011520673B2

(12) United States Patent
Vengurlekar et al.

(10) Patent No.: US 11,520,673 B2
(45) Date of Patent: Dec. 6, 2022

(54) MAINTENANCE OPERATIONS BASED ON ANALYSIS OF COLLECTED DATA

(71) Applicant: Hewlett Packard Enterprise Development LP, Houston, TX (US)

(72) Inventors: Tushar Vengurlekar, Bangalore Karnataka (IN); James Ramsay, Westborough, MA (US); Mohammed Saleem, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 205 days.

(21) Appl. No.: 16/934,260

(22) Filed: Jul. 21, 2020

(65) Prior Publication Data

US 2022/0027247 A1    Jan. 27, 2022

(51) Int. Cl.
| | |
|---|---|
| *G06F 11/00* | (2006.01) |
| *G06F 11/30* | (2006.01) |
| *G06F 9/455* | (2018.01) |
| *G06F 9/4401* | (2018.01) |
| *G06F 11/14* | (2006.01) |

(52) U.S. Cl.
CPC .......... *G06F 11/3034* (2013.01); *G06F 9/442* (2013.01); *G06F 9/45558* (2013.01); *G06F 11/1438* (2013.01); *G06F 11/3072* (2013.01); *G06F 2009/45591* (2013.01)

(58) Field of Classification Search
CPC ............. G06F 11/3034; G06F 11/1438; G06F 11/3072; G06F 9/442; G06F 9/45558; G06F 2009/45591; G06F 8/656

USPC ....................................................... 714/1–57
See application file for complete search history.

(56) References Cited

U.S. PATENT DOCUMENTS

| | | | |
|---|---|---|---|
| 8,417,991 B2 | 4/2013 | Venkataraja et al. | |
| 2007/0283091 A1* | 12/2007 | Nagae ................... | G06F 3/0685 711/170 |
| 2009/0172461 A1* | 7/2009 | Bobak ................. | G06F 11/0709 714/2 |

(Continued)

OTHER PUBLICATIONS

Jay Bounds, "High-availability (HA) Pair Controller Configuration Overview and Best Practices," NetApp, Technical Report, Feb. 2016, pp. 1-37, TR-3450.

(Continued)

*Primary Examiner* — Sarai E Butler
(74) *Attorney, Agent, or Firm* — Trop, Pruner & Hu, P.C.

(57) ABSTRACT

Analytics-based optimized maintenance operations for a hyper-converged infrastructure are described. An example includes instructions to establish an order for a sequence of maintenance operations including collecting data points that relate to high availability of multiple nodes in a storage infrastructure; performing analysis of the collected data, including discovery of groups of nodes that don't have mutual relations with other paired nodes; receiving a request to perform a maintenance operation for the plurality of nodes; generating an ordered sequence of groups of nodes for the maintenance operation based at least in part on the analysis of the collected data, each group including one or more nodes; and performing the maintenance operation for the plurality of nodes according to the sequence of groups of nodes, wherein the maintenance operation includes a power cycle for each of the plurality of nodes.

20 Claims, 9 Drawing Sheets

(56) References Cited

U.S. PATENT DOCUMENTS

| | | |
|---|---|---|
| 2010/0185719 A1* | 7/2010 | Howard ................ G06F 15/163 709/201 |
| 2014/0304398 A1 | 10/2014 | Carlen et al. |
| 2014/0372788 A1* | 12/2014 | Vavrick ............... G06F 11/0793 714/4.1 |
| 2014/0380100 A1* | 12/2014 | Mikami ................ G06F 11/079 714/37 |
| 2015/0049632 A1 | 2/2015 | Padmanabhan et al. |
| 2015/0269045 A1* | 9/2015 | Riedle ................. G06F 11/2023 714/6.3 |
| 2016/0098328 A1* | 4/2016 | Lucas ..................... G06F 1/30 714/14 |
| 2017/0155550 A1 | 6/2017 | Cooper |
| 2018/0075406 A1* | 3/2018 | Kingston ........... G06Q 10/0833 |
| 2019/0317751 A1 | 10/2019 | Ramsay et al. |
| 2020/0133657 A1* | 4/2020 | Yan ...................... G06F 3/0632 |
| 2021/0149774 A1* | 5/2021 | Denneman .......... G06F 11/1448 |
| 2021/0208915 A1* | 7/2021 | Hogan .................. G06F 9/5088 |

OTHER PUBLICATIONS

Vincent Gramoli et al., "Rollup: Non-disruptive Rolling Upgrade with Fast Consensus-based Dynamic Reconfigurations," Jan. 2015, pp. 1-15.

* cited by examiner

FIG. 1

HCI CLUSTER SMART MAINTENANCE SCHEDULING

Collection of Cluster Data for Maintenance Operations:
- Cluster Health
- Data Gravity
- Data Placement

210

Determination of Data Regarding HCI Nodes:
- Node Weightage
- Hive Relation of Nodes

220

Creation of Additional Space for VM Migration
- Identification of Non-Mission Critical VMs
- Power Off Identified VMs
- Calculation of Space Created

230

Establishment of Optimized Upgrade Schedule
- Arrangement of Compatible Nodes For Going Through Power Cycle
- Arrangement of Nodes Based on Node Weightage and Data Gravity

OPTIMIZATION OF UPGRADE SEQUENCE FOR NODES OF HCI CLUSTER

Optimized Map for Upgrade Sequence 300

| Node | Primary Hive | Secondary Hive | MAP | Time For Upgrade: Sequential Schedule | Time For Upgrade: Smart Schedule |
|---|---|---|---|---|---|
| 1 | VM1, VM3 | VM2 |  | 90 | 90 |
| 2 |  | VM1 |  | 90 | 90 |
| 3 | VM4 | VM3, VM5 | (3 | 90 | 90 |
| 4 | VM5, VM7, VM9 | VM4 | 3) | 90 |  |
| 5 | VM10 | VM8 | (2 | 90 |  |
| 6 | VM8 | VM7 | 2 | 90 |  |
| 7 |  | VM10 | 2) | 90 |  |
| 8 | VM2 | VM9 | (1 1 1) |  |  |
|  |  |  | Total Time | 720 (12 Hrs) | 270 (4.5 Hrs) |

HYPER-CONVERGED ARCHITECTURE – UPGRADE SEQUENCE

VSA = Virtual Storage appliance
Arrows = Data Mappings With Other Nodes in Cluster
HA Pairs = High Availability Pairs of Data Hives

MAINTENANCE OPERATIONS BASED ON ANALYSIS OF COLLECTED DATA

BACKGROUND

A hyper-converged infrastructure (HCI) is in general a software-defined information technology infrastructure in which all elements are virtualized. An HCI includes a combination of varied servers and storage devices in the software defined data center architecture. Within such an infrastructure there are commonly clusters, with each cluster including a set of nodes.

During life cycle management for a hyper-converged cluster it is often necessary to provide a power cycle (reboot) of each node in order to install upgrades. However, it is common for there to be overlapping pairs of data in high availability (HA) nodes, thus preventing such nodes from being rebooted at the same time.

A conventional system may perform an upgrade of multiple HCI nodes of a cluster in a sequential schedule of individual nodes. However, such an upgrade schedule is inefficient because it only allows the upgrade of one node at a time, thus requiring a long time period to complete the upgrade. Further, this maintenance process generally does not take into account how data is synchronized between nodes, or how the data storage and processing that are required to be offloaded from nodes during a power cycle can be best provided, thus further reducing efficiency and increasing the risk of faults occurring in the upgraded nodes.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to analytics-based maintenance operations for a hyper-converged infrastructure.

In a system upgrade (such as firmware, hypervisor OS, or software-based virtual controller) of a hyper-converged infrastructure (HCI) including multiple nodes, a power cycle (a reboot) of each node is often essential to install new software components. During such upgrade it is also necessary to maintain intact data accessibility without disrupting customer services or causing unnecessary downtime.

However, the upgrade of a pool of nodes (an HCI cluster) that maintains data availability between HA (High Availability) pairs of nodes in an overlapping manner is not generally resilient to a power cycle or outage to more than a single node at a time. In an HCI cluster, it is very common to have data locality and redundancy maintained between a pair of nodes, with possible overlaps of active and passive data pairs. Due to overlapping pairs of data, there is a high probability that neighboring or subsequent nodes will contain a distinct copy of data that imposes a restriction on rebooting both nodes at the same time, or choosing the immediate subsequent pair for maintenance purposes. For this reason, a conventional maintenance operation will perform a sequential upgrade of each node within a cluster such that only one node goes through a power cycle at a time.

In hyper-converged systems, one of the main challenges to address during an upgrade is that, when a particular node is down for maintenance, the load that is generally handled by this node is to be migrated to its peer node in the HA pair. However, the conventional upgrade algorithm performs the sequential upgrade of nodes without consideration of issues of data mappings, data gravity, and resource distribution of nodes that affect such data migration. In a conventional upgrade operation, there is generally no means of determining the resource availability of nodes that provide compute and storage capacity in the peer node to take up the additional load during the upgrade when required.

Similarly, a conventional upgrade algorithm generally does not consider issues of data synchronization between nodes. A sequential upgrade of nodes will not ensure that data of a node is in sync with a peer node before issuing a subsequent power cycle to the next node on which software has to be updated. Data synchronization is an inherent and essential process across any two nodes in an HA pair to maintain high availability. During a maintenance window of a node, the paired nodes continue to accumulate incoming data changes, and, when the maintenance window ends, the delta changes that have occurred need to then be re-synced between the nodes.

In some embodiments, an apparatus, system, or process provides improved maintenance operation in a hyper-converged infrastructure utilizing predictive analytics to determine an optimized node upgrade schedule. In some embodiments, a node sequencing algorithm is utilized to generate optimized mapping of nodes of an HCI cluster for a maintenance operation that requires a power cycle of each node.

In some embodiments, predictive analytics are applied to evaluate data mapping to create a cluster map providing a sequence of groups of nodes for maintenance operations, wherein the sequence is optimized to avoid downtimes and to reduce the total duration of the maintenance operation. In some embodiments, a node sequencing algorithm identifies nodes that can go through a power cycle together in a group, and arranges the groups of nodes based on analysis of analysis of collected data for the nodes.

In some embodiments, an analytics engine is to utilize knowledge of data gravity and hive placement in the generation of a map for upgrade of the nodes of an HCI cluster. The resulting sequence of maintenance disruptions (server power-cycles) will maintain high availability of data and uninterrupted customer services. In some embodiments, the analytics engine further is to provide for additional capacity on fail-over nodes by temporarily shutting down the non-system critical workload.

An example of analytics-based optimized maintenance operations for a hyper-converged infrastructure includes instructions to establish an order for a sequence of maintenance operations, including collecting data points that relate to high availability of multiple nodes in a storage infrastructure; performing analysis of the collected data, including discovery of groups of nodes that don't have mutual relations with other paired nodes; receiving a request to perform a maintenance operation for the plurality of nodes; generating an ordered sequence of groups of nodes for the maintenance operation based at least in part on the analysis of the collected data, each group including one or more nodes; and performing the maintenance operation for the plurality of nodes according to the sequence of groups of nodes, wherein the maintenance operation includes a power cycle for each of the plurality of nodes.

As used herein, HCI cluster, or cluster, refers to multiple HCI nodes that have been grouped together.

Figure 1:
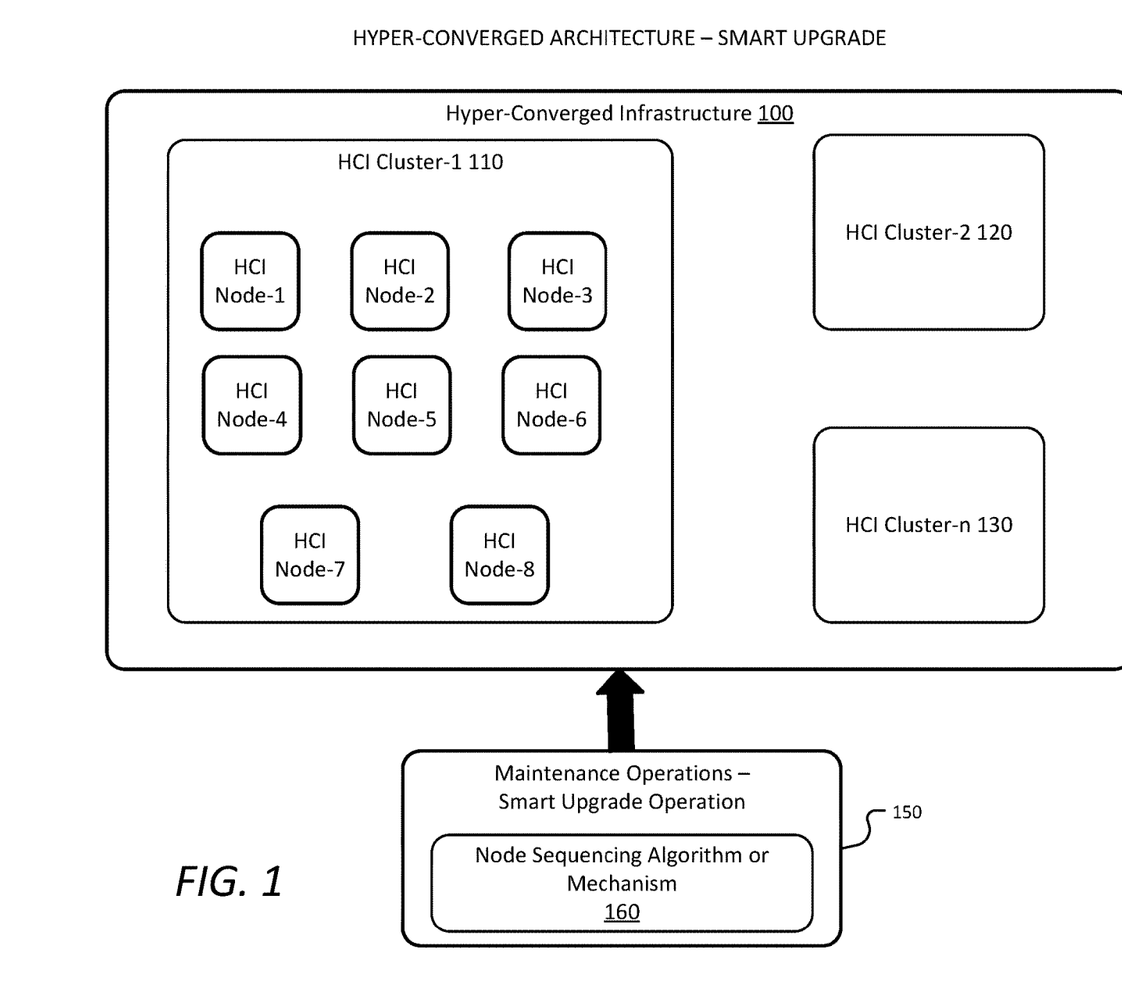
FIG. 1 is an illustration of an HCI architecture to provide smart upgrade operations for HCI clusters, according to some embodiments.

FIG. 1 is an illustration of an HCI architecture to provide smart upgrade operations for HCI clusters, according to some embodiments. As illustrated in FIG. 1, a hyper-converged infrastructure 100 may include multiple HCI clusters, which are illustrated as HCI Cluster-1 110, HCI Cluster-2 120, and continuing through HCI Cluster-n 130. Each of the HCI clusters may include multiple HCI nodes, which, for example, may include eight nodes within HCI Cluster-1, with the HCI nodes being illustrated in FIG. 1 as HCI Node-1 through HCI Node-8.

During operation of the hyper-converged infrastructure 100, there will be necessary maintenance that requires a power cycle (reboot) of each HCI node. However, certain of the nodes within an HCI cluster are within HA pairs, and thus cannot be rebooted at the same time. It is possible to conventionally reboot the HCI nodes sequentially, such as rebooting HCI Node-1, followed by HCI Node-2, and continuing through HCI Node-8 (or any other random order of the HCI nodes within the cluster). However, such an upgrade sequence is inefficient as it only allows upgrade of one HCI node at a time. The sequence also does not take into account data synchronization between HA pairs, and thus may require delayed synchronization of delta changes if, for example, a pair of HA nodes are upgraded in sequence. Further, such an upgrade sequence does not into consideration how to effectively handle the data storage and processing that needs to be offloaded from an HCI node during the upgrade power cycle.

In some embodiments, maintenance operations 150 for HCI clusters of the hyper-converged infrastructure 100 are performed utilizing a smart upgrade operation to optimize the mapping of the upgrade sequence, and thereby providing improvements in efficiency and fault tolerance for the hyper-converged infrastructure 100.

In some embodiments, a node sequencing algorithm or mechanism 160 is provided to generate the optimized upgrade sequencing. The algorithm or mechanism 160 is to evaluate data placement and data gravity of HCI nodes for use in determining a best upgrade sequence for such nodes. The algorithm or mechanism 160 is further to consider compute resource utilization, cluster health, and network bandwidth in establishing suitable maintenance windows for the nodes. In some embodiments, the node data is collected (such as periodically or upon the occurrence of certain triggers or events) and analyzed by an analytics engine (such as, for example, an analytics-based infrastructure management system).

In some embodiments, during the commencement of a maintenance operation, such as an upgrade, the analytics engine is to generate a cluster map to be utilized in generating a sequence of nodes to be invoked for the maintenance operation. The node sequencing algorithm or mechanism 160 is to optimize the cluster map based on resource/data placements to avoid any operational downtimes and to reduce the total duration of the maintenance operation.

In some embodiments, the node sequencing algorithm or mechanism 160 is to evaluate data and its relationship among other nodes in a cluster to find optimal groupings of nodes that can be safely disrupted simultaneously. The algorithm or mechanism may first consider a node having less amount of utilization in terms of data access as well as placement to be part of the operation. This thus can prevent unnecessary back and forth movement of data access pointers (guest virtual machines) and the I/O load running on those systems.

In some embodiments, smart upgrade operations for an HCI cluster include the processes illustrated in FIGS. 2, 6A, 6B, and 7. In some embodiments, the smart upgrade operations may be performed by a system as illustrated in FIG. 8.

Figure 2:
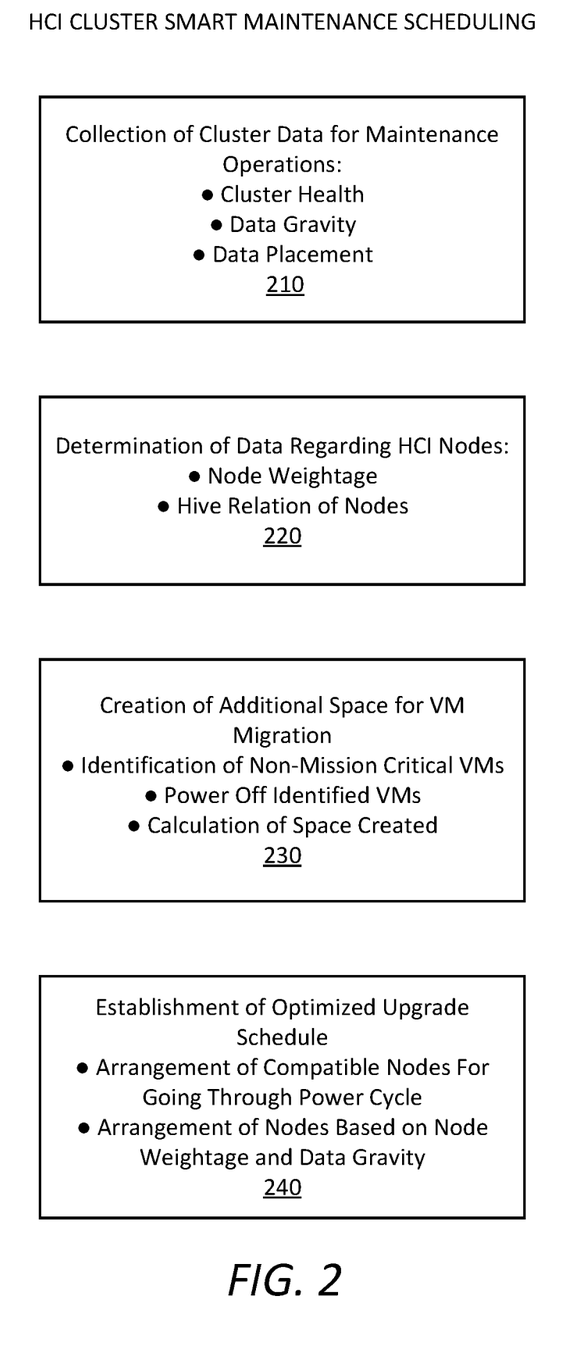
FIG. 2 is an illustration of operations for HCI cluster smart maintenance scheduling, according to some embodiments.

FIG. 2 is an illustration of operations for HCI cluster smart maintenance scheduling, according to some embodiments. As shown in FIG. 2, operations in connection with smart maintenance scheduling for nodes of an HCI cluster utilize predictive analytics to determine an optimal upgrade schedule.

In some embodiments, operations 210 include collection of cluster data for maintenance operation, wherein the collected data may include, but is not limited to, cluster health, data gravity (data gravity of a node referring to the ability of a node to attract an application and its services (in the form of guest VMs and its data disks) to correctly placed data to enable migration flexibility), and data placement of the HCI nodes. Such data may be collected periodically, upon command, or upon other triggering processes.

In some embodiments, upon receipt of a request for an upgrade for nodes of an HCI cluster, operations 220 may include determination of data regarding each node of the cluster. The data may include determination of node weightage (referring to weightage to absorb power disruption, as further illustrated in FIG. 4), and the hive relation of the HCI nodes within the HCI cluster. As used herein, a hive is a store of unique data objects that represent user and system data. A hive may also be referred to as a file system instance.

In some embodiments, while hive relation and data gravity are primary factors in determining the sequence of a maintenance operation, additional factors such as resource predictions may be utilized to guide a choice of a suitable upgrade window for each node in order to suggest a best fit for each power cycle. Migration capability is based on how much workload a node can absorb when the workload is required to be migrated due to multiple nodes being rebooted in parallel. In some embodiments, the resource predictions are based on historical trends over a certain period of time.

In some embodiments, the operations 230 further provide for creation of additional space for virtual machine (VM) migration during the upgrade process. In some embodiments, a process may include identification of non-mission critical virtual machines that are supported by one or more nodes of the HCI cluster; temporary shutdown of one or more of the identified non-mission critical virtual machines (which may include powering off all of such VMs); and calculation of the additional space that was created by the temporary halting of such VMs. In some embodiments, one or more of the identified non-mission critical virtual machines may be restarted when one or more power cycles are completed for the upgrade operation.

In some embodiments, the operations 240 include the establishment of an optimized upgrade schedule for the nodes of the HCI cluster. The establishment of the upgrade schedule may include arranging nodes that are compatible for going through a power cycle together, and further arranging the nodes based on node weightage and data gravity.

Figure 6A:
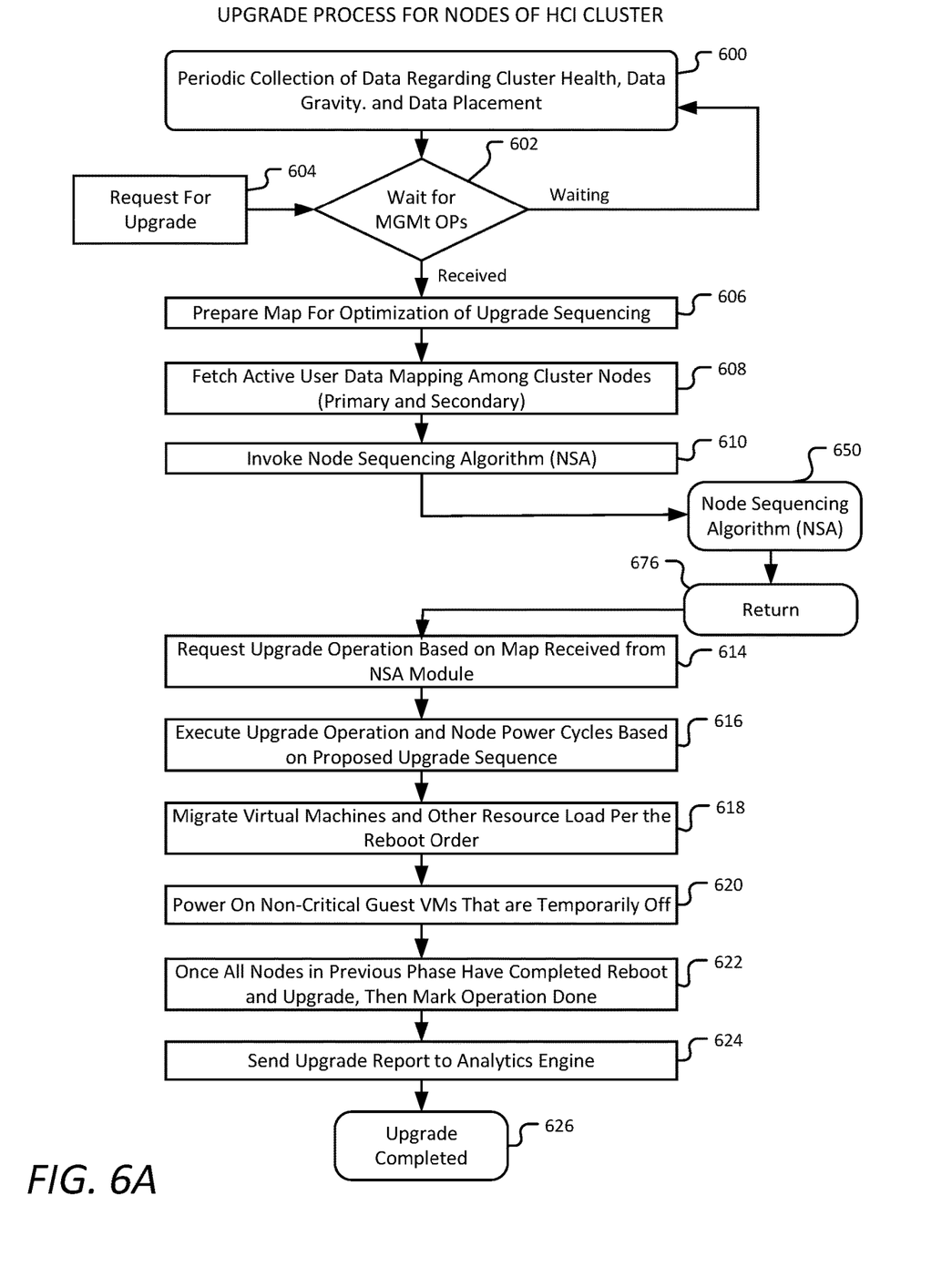
FIGS. 6A and 6B provide a flow chart to illustrate operations for smart upgrade of nodes of an HCI cluster, according to some embodiments.
Figure 6B:
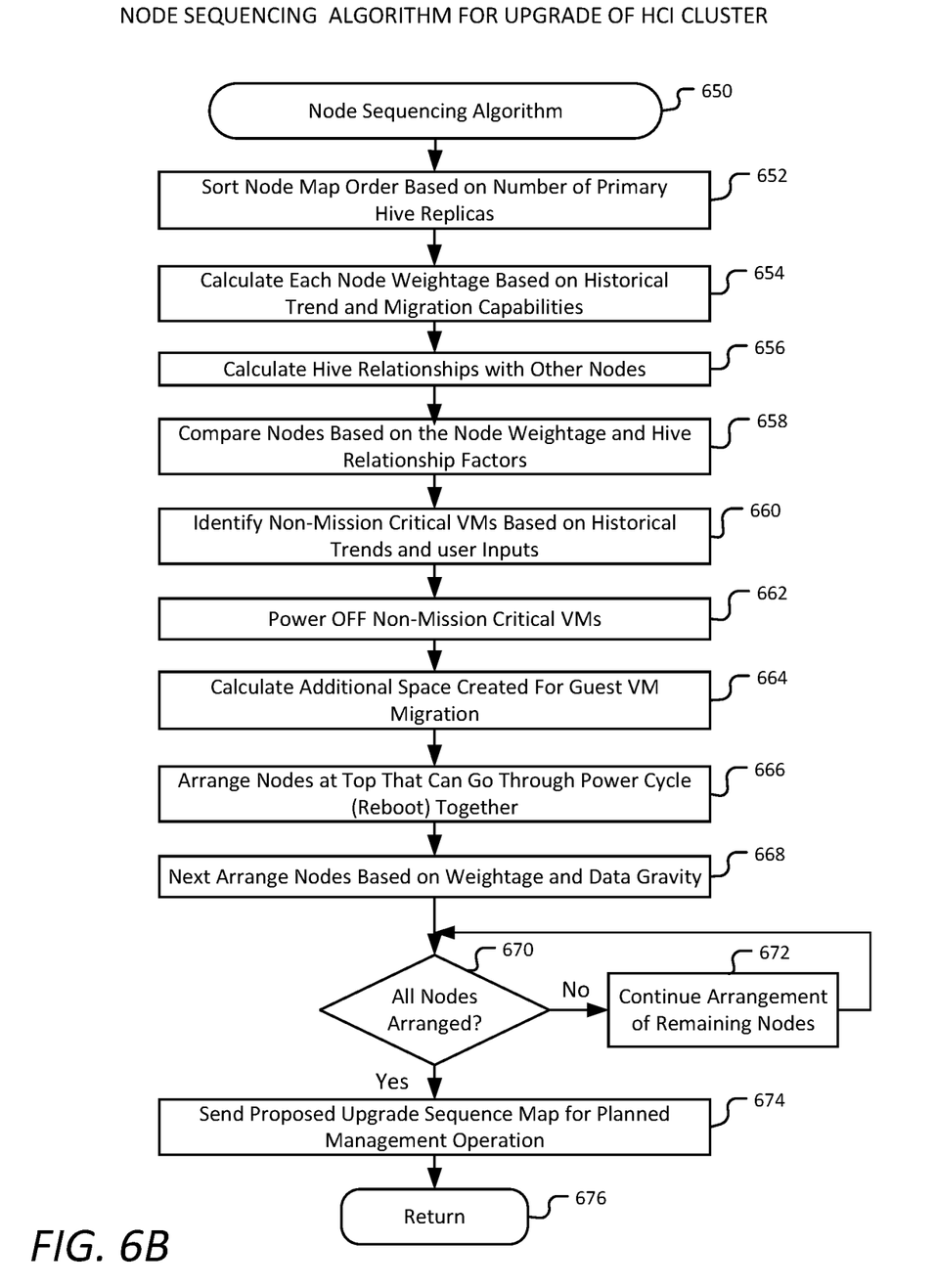
Figure 7:
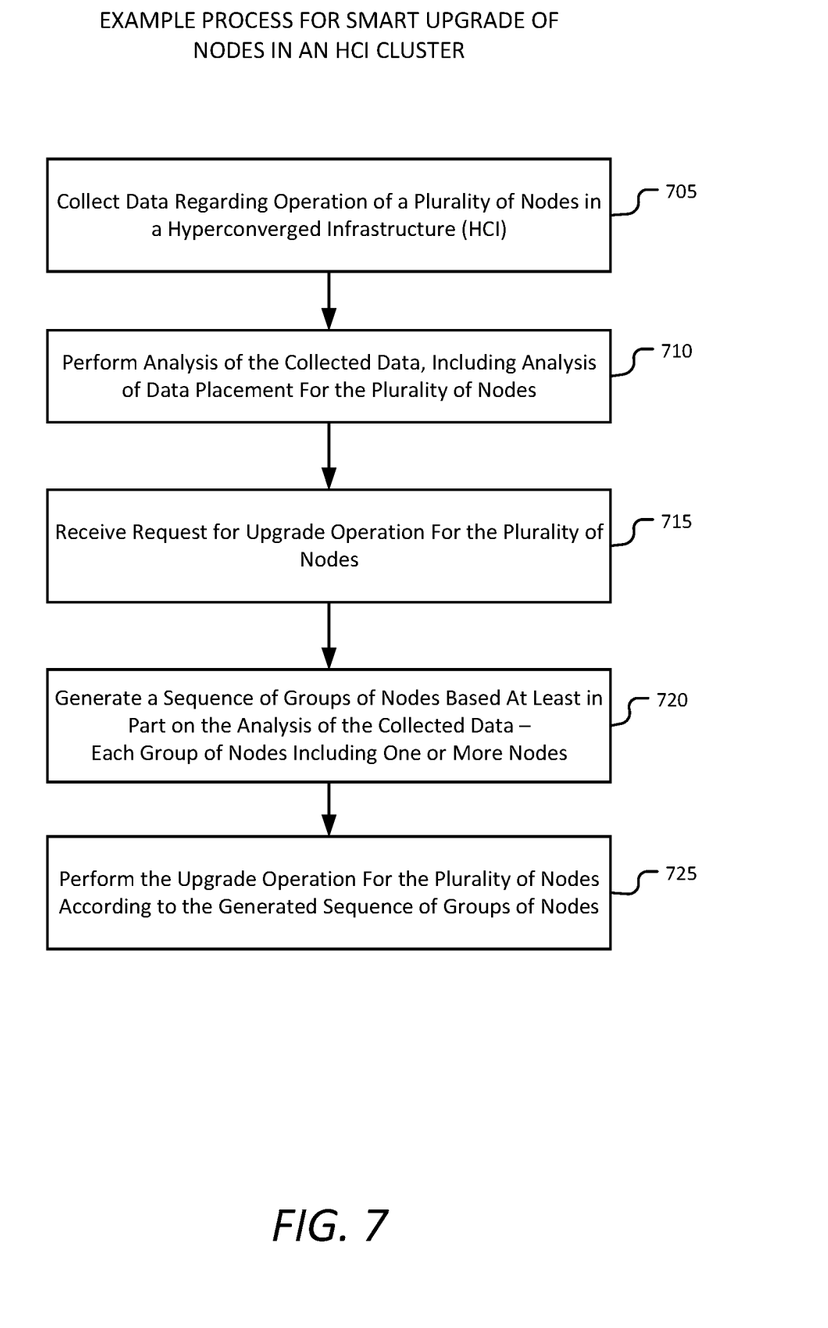
FIG. 7 is a flow chart to illustrate an example of a process for smart upgrade of nodes of an HCI cluster, according to some embodiments.
Figure 8:
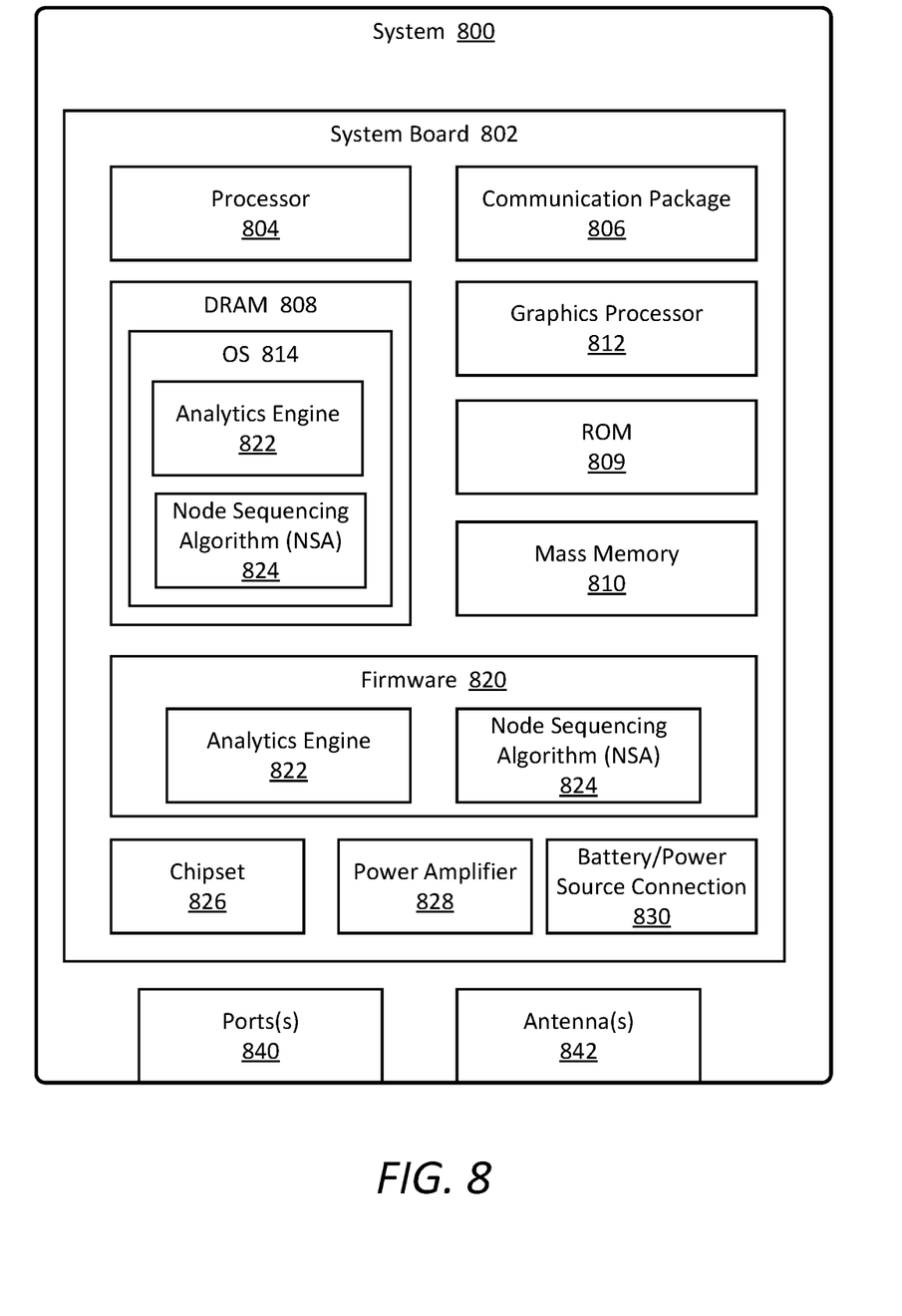
FIG. 8 is an illustration of a system to provide smart upgrade of HCI clusters, according to some embodiments.

Operations for HCI cluster smart maintenance scheduling are further illustrated in FIGS. 6A, 6B, and 7.

Figure 3:
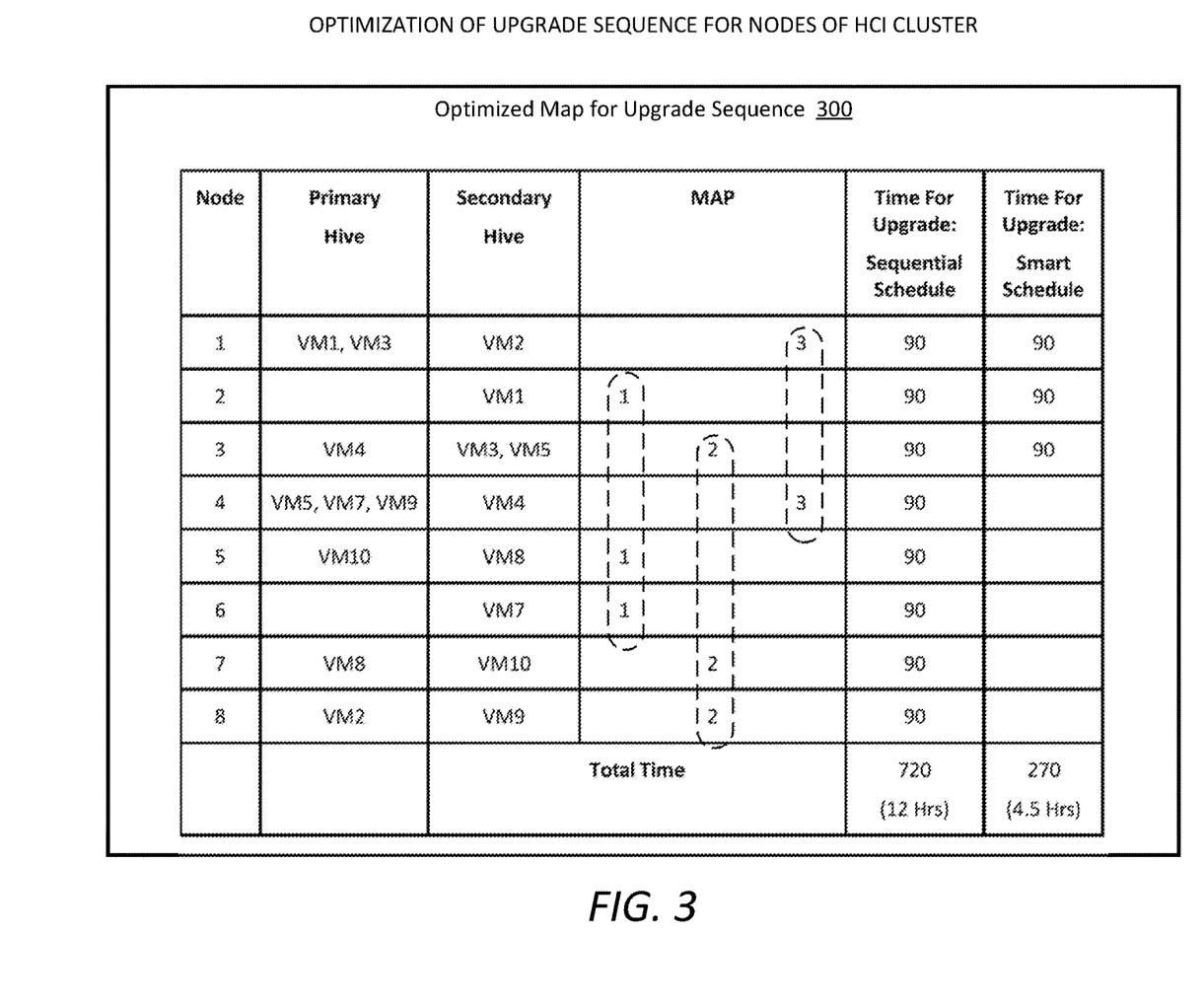
FIG. 3 is an illustration of an example optimization of an upgrade sequence for nodes of an HCI cluster, according to some embodiments.

FIG. 3 is an illustration of an example optimization of an upgrade sequence for nodes of an HCI cluster, according to some embodiments. As illustrated in the optimized map for upgrade sequence 300 in FIG. 3, an HCI cluster including eight nodes (such as HCI Cluster-1 110 with HCI nodes Node-1 through Node-8 illustrated in FIG. 1) may include a certain set of primary and secondary hives for the indicated guest virtual machines (VMs), each hive being a store of unique data objects that represent user and system data. In HCI clusters, guest VMs and the associated application data points are tightly coupled with Hive HA pairs. These hives hold the digest map for a unique data tree of de-duplicated chunks of data.

In some embodiments, an apparatus, system, or process is to determine an optimized sequence of nodes for upgrade, wherein the optimized sequence may include performing power cycles for multiple nodes at a same time upon determining that the nodes are compatible for simultaneous upgrade. In the illustrated example shown in FIG. 3, the HCI nodes may be grouped into three sets of nodes that do not include any overlap in terms of the virtual machine support. For example, a first set of nodes may include Node-2 (VM1), Node-5 (VM10, VM8), and Node-6 (VM7); a second set of nodes includes Node-3 (VM4, VM3, VM5), Node-7 (VM8, VM10), and Node-8 (VM2, VM9); and a third set of nodes includes Node-1 (VM1, VM3, VM2) and Node 4 (VM5, VM7, VM9, VM4).

In this manner, the HCI nodes may be upgraded in three upgrade power cycles, or a total of 270 minutes (if it assumed that an upgrade cycle requires 90 minutes), in comparison with a conventional sequential upgrade sequence requiring eight upgrade power cycles, or a total of 720 minutes, which in this case would be a reduction of 62% of downtime. The optimized upgrade sequence allows for parallel upgrade, with no downtime for guest VMs while upgrading multiple nodes at the same time. Further, this eliminates possible file incidents that may occur due to upgrade delays and errors occurring because of hive synchronization.

Figure 4:
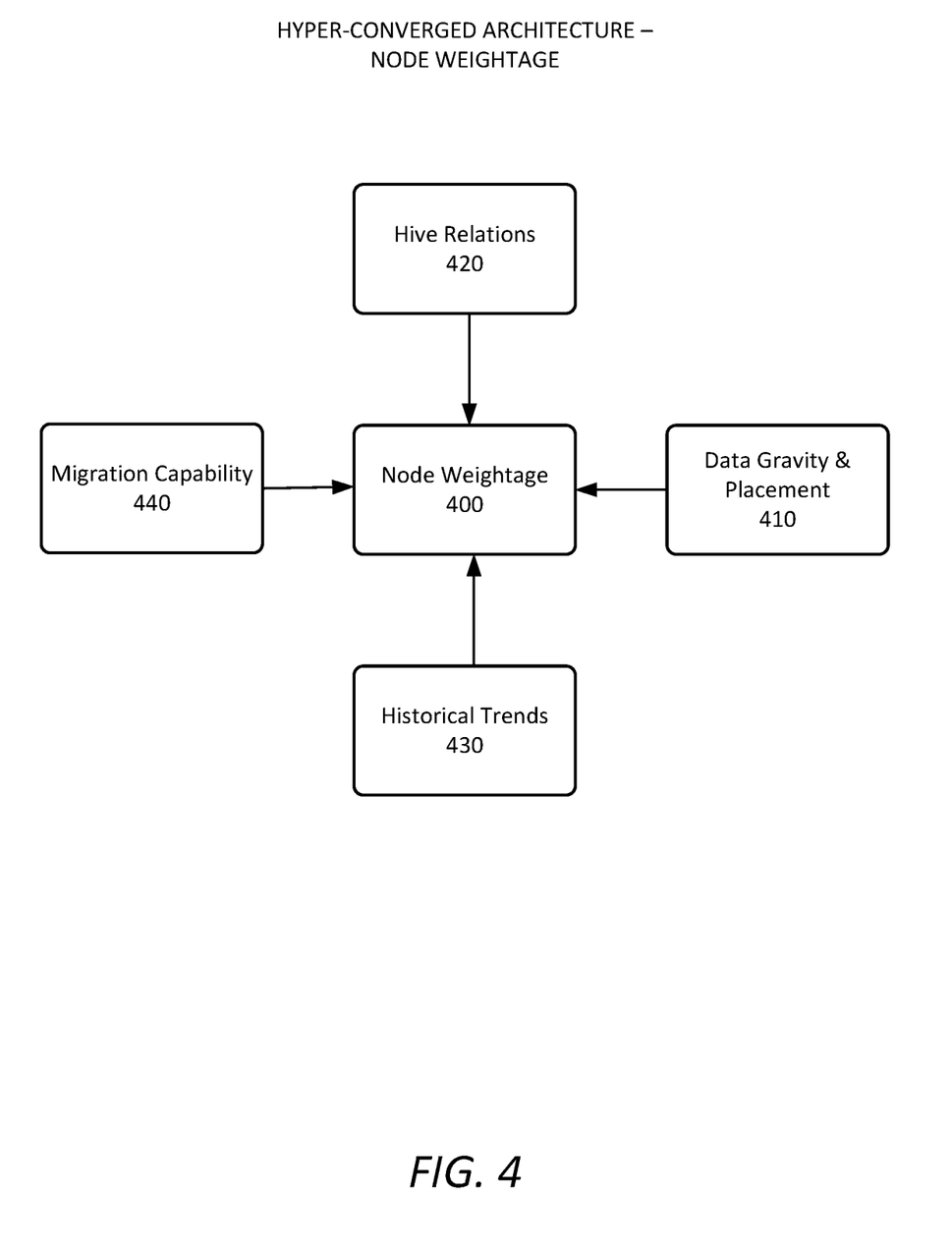
FIG. 4 is a diagram to illustrate calculation of node weightage for smart upgrade of HCI nodes, according to some embodiments.

FIG. 4 is a diagram to illustrate calculation of node weightage for smart upgrade of HCI nodes, according to some embodiments. In some embodiments, an apparatus, system, or process is to calculate a node weightage for each node in an HCI cluster for use in optimizing upgrade scheduling for nodes of an HCI cluster.

The node weightage is a value that reflects the capability of a node to absorb power disruption in upgrade operations. In some embodiments, the node weightage 400 is calculated based on the following factors:

(1) Data gravity and placement 410—In HCI clusters, guest virtual machines (VMs) and the associated application data points are tightly coupled with Hive HA pairs. In these terms, the data gravity refers to the ability of a node to attract an application and its services (in the form of guest VMs and its data disks) to the correctly placed data to enable migration flexibility. For example, the lack of any virtual machine operation would imply low data gravity for a node, and thus such node will provide less disruption when data or processes are moved. In some embodiments, the calculated node weightage 400 of a particular node is directly proportional to the data gravity for such node.

In some embodiments, data gravity values are calculated for each application/virtual machine that is using data at that time. The node or nodes having the lowest data gravity may then be moved up in the map for upgrade scheduling. In some embodiments, a process or system may include quiescing the VM load running on the lowest data gravity nodes to thus provide zero data gravity. A node having zero data gravity may have associated virtual machines but such virtual machines are all in a power off (not running) state.

(2) Hive relations within the cluster boundary 420—The hive relations for nodes of an HCI cluster refer to the virtual machines supported by the nodes. The hive relations for nodes may be, for example, as illustrated in in FIG. 3 for the primary hive and the secondary hive. It is noted that hive location is generally static unless explicitly requested to move, which is a complex and time consuming operation. In some embodiments, a request to move a hive location may be either rejected or queued during a maintenance window, and thus algorithm operation is not affected as hive relations are calculated at the time of operation within the maintenance window.

(3) Resource predictions with respect to historical trends 430—The resources that are predicted to be available by each node of the HCI cluster are based on the determined data and operational history of each node.

(4) Migration capabilities 440—Migration capability refers to the capability of each node to support migration of data and processes from each other node during the required upgrade power cycle for the other nodes. Migration capability is an important factor to consider in determining the resource availability for VMs that will need to migrate during the power cycle of other nodes in a cluster.

In order to run multiple power cycles operations in parallel, an algorithm or mechanism is to check for overlapping of data bindings across nodes in the cluster. This data provides information regarding whether rebooting a particular group of nodes is possible because the nodes either do not have any relation to the other nodes' data placement in terms of HA pairs, or have a relation that is not active at the moment due to unavailability of data access clients, and thus the nodes may be selected to undergo the maintenance operation in parallel. The amount of time taken to complete the maintenance operation can be significantly reduced if groups of nodes can be identified for parallel maintenance, which thus allows for improvement in data throughput for the system, as well as reducing the chances of data unavailability or failure in the nodes of the system.

Figure 5A:
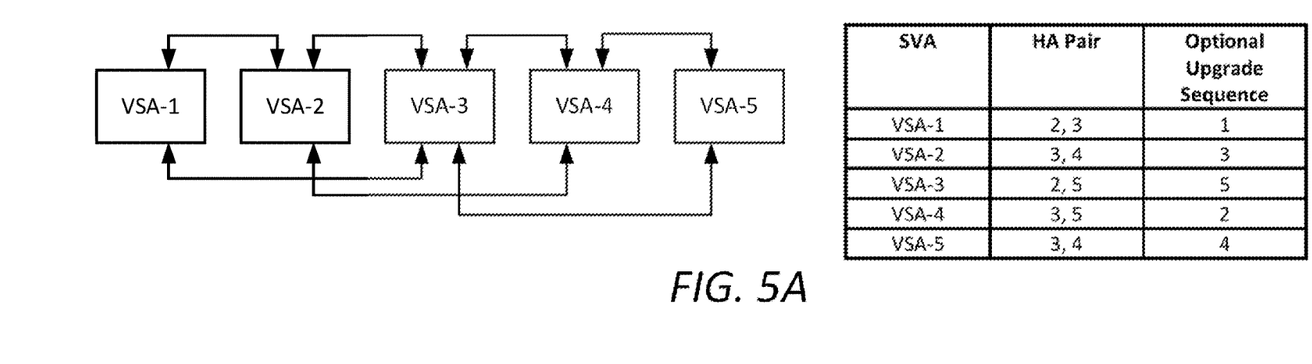
FIGS. 5A and 5B are illustrations of example upgrade sequences for nodes of an HCI cluster, according to some embodiments.
Figure 5B:
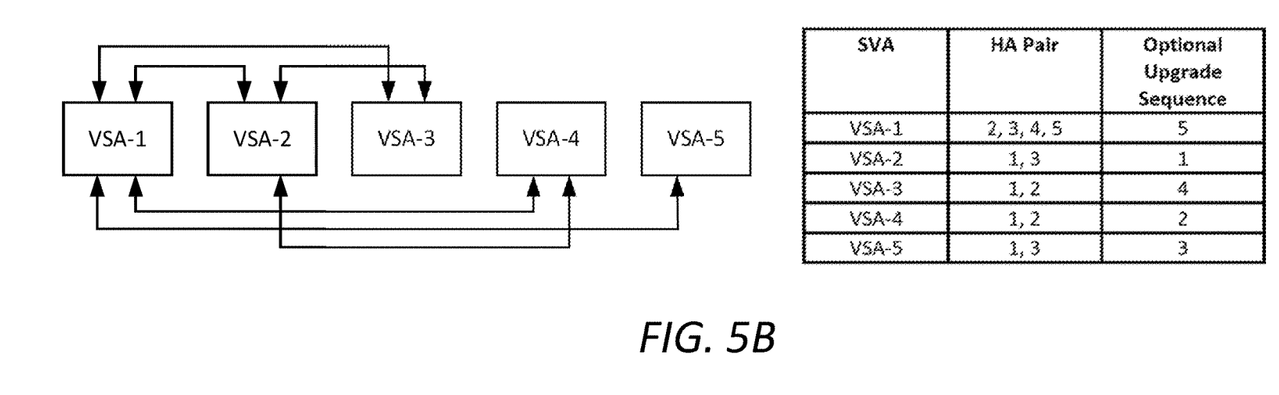

FIGS. 5A and 5B are illustrations of example upgrade sequences for nodes of an HCI cluster, according to some embodiments. A server software/firmware upgrade generally causes downtime of approximately 60 minutes. During this time, the new/modified user data (the delta data) is accumulated on its pair node(s) as a single copy. When the rebooted node comes back online following upgrade, this node begins synchronizing the delta contents from its peer node to maintain high availability (i.e., to provide a second copy). However, if the node from which the rebooted node is fetching data to synchronize is itself selected for an upgrade, then it is necessary to wait until the data synchronization is completed to avoid data unavailability of the delta changes.

In some embodiments, an algorithm is to avoid consideration of such peer nodes for the next immediate upgrade operation, instead selecting other nodes that do not have data overlap, In another example, the algorithm is to select nodes having less workload or data access at that time to avoid frequent back and forth data access (i.e., reducing the number of VM migrations between nodes).

As provided in the examples shown in FIGS. 5A and 5B, five virtual storage appliances (VSAs), illustrated as VSA-1 through VSA-5, are illustrated together with the HA hive pair relations for each node. In some embodiments, the HA pair relationship may be utilized in determining an optimal upgrade sequence for the nodes of the HCI clusters. This reduces the maintenance window by eliminating the time taken for data synchronization due to node reboots, and further avoids unwanted back and forth transfer of data ownership, thus saving additional time.

In a first example, as shown in in FIG. 5A, based on the HA pair relationships, an apparatus, system, or process may determine an optimal upgrade sequence of VSA-1, VSA-4, VSA-2, VSA-5, and VSA-3. As a result, the data sync window will not affect or delay the subsequent reboot of the next upgraded node as HA pairs of data hives are not overlapping.

In a second example, as shown in FIG. 5B, an apparatus, system, or process may determine an optimal upgrade sequence of VSA-2, VSA-4, VSA-5, VSA-3, and VSA-1. In some embodiments, along with the consideration of non-overlapping hive HA pairs, the apparatus, system, or process further considers the amount of data gravity of VSA-1, which thus can be scheduled to be rebooted at the end of the upgrade sequence (5th position in this example) to avoid possible back and forth of data ownership in terms of virtual machine(s) migration.

FIGS. 6A and 6B provide a flow chart to illustrate operations for smart upgrade of nodes of an HCI cluster, according to some embodiments. In some embodiments, the process in FIG. 6A may include at 600 periodic collection of data regarding cluster health, data gravity, and data placement. The process may continue as required while waiting at 602 for management operations. Upon receiving a request for upgrade of HCI nodes 604, the process then proceeds at 606 with preparation of a map for optimization of upgrade sequencing, and fetching at 608 active user data mapping among the cluster nodes, for both primary and secondary hive relations. In some embodiments, the process then continues at 610 with invoking a node sequencing algorithm (NSA), and proceeding at 650 to the NSA module as illustrated on FIG. 6B.

As the process continues on FIG. 6B for the node sequencing algorithm 650, the algorithm provides for sorting at 652 the node map order based on the number of primary hive replicas for each node, and calculating at 654 the node weightage of each node based on data including historical trends and migration capabilities of each node. In some embodiments, the node weightage may be determined as illustrated in FIG. 4. The process further includes calculating at 656 the hive relationships of each node with other nodes. In some embodiments, the algorithm then provides for comparing at 658 the nodes of the HCI cluster based on the determined node weightage and hive relationship factors for each node.

In some embodiments, the algorithm is further to identify at 660 any non-mission critical virtual machines (referring to any virtual machines that are not required to continue the critical functions of the system) based on historical trends and user inputs. The process then provides at 662 for shutting down one or more of the identified non-mission critical VMs. This may include shutting down all such identified VMs, or, for example, shutting down a sufficient number of VMs to provide a certain level of resources. The algorithm then provides for calculating at 664 the amount of additional space that has thus been created for guest virtual machine migration during the power cycles for the node upgrades.

In some embodiments, the algorithm then provides for arranging at 666 nodes for the upgrade sequence that can go through a power cycle together at the top of the upgrade schedule. This is then followed by arranging at 668 the nodes based on the determined node weightage and data gravity of each node. If all nodes are not yet arranged ("NO" at 670), the process may continue at 672 with arrangement of the remaining nodes in the scheduled sequence. Upon completion of the node arrangement ("YES" at 670), the proposed upgrade sequence is sent at 647 for the planned management operation, and the process returns at 676 to the upgrade operations.

As illustrated in FIG. 6A, upon returning at 676 from the operation of the node sequencing algorithm, a request is made at 614 for the upgrade operation based on the map received from the NSA module. The upgrade operation is then executed at 616 for the nodes of the HCI cluster, with the node power cycles being performed according to the proposed upgrade sequence received from the NSA. In some embodiments, the virtual machines and resource loads are migrated at 618 to other nodes according to the upgrade sequence. Upon performing the node reboots, the non-critical guest VMs that were shut down prior to commencing the maintenance operation may then be restarted at 620.

Once all nodes in the previous phase have completed the reboot and upgrade, the maintenance operation may be marked as done at 622. An upgrade report may then be sent at 624 to the analytics engine to update the status, and the upgrade process is complete at 626.

FIG. 7 is a flow chart to illustrate an example of a process for smart upgrade of nodes of an HCI cluster, according to some embodiments. As illustrated in FIG. 7, a process, at 705, includes collecting data regarding operation of a plurality of nodes in a hyper-converged infrastructure. The plurality of nodes may include, for example, the nodes of HCI Cluster-1 110 illustrated in FIG. 1. The data collected may include, but is not limited to, data regarding cluster health, data gravity, and data relationships related to the nodes. At 710, the process continues with performing analysis of the collected data, including analyzing data placement for the plurality of nodes.

At 715, a request to perform an upgrade operation for the plurality of nodes may be received. The upgrade operation may include an update of each node, which requires that a power cycle (reboot) be performed for each node. For this reason, data sharing between the nodes and requirements for migration of data during the upgrade of each node are affected by the upgrade process.

The process continues with, at 720, generating a sequence of groups of nodes for the upgrade operation based at least in part on the analysis of the collected data, each group of nodes including one or more nodes. In this manner, the ordering of the upgrade schedule may be optimized, with nodes that can be upgraded together being grouped together in the generated sequence.

At 725, the upgrade operation for the plurality of nodes is then performed according to the generated sequence of groups of nodes, allowing for improvements in efficiency and fault tolerance in performance of the upgrade process for the hyper-converged infrastructure.

FIG. 8 is an illustration of a system to provide smart upgrade of HCI clusters, according to some embodiments. In some embodiments, the system 800 may provide for operations related to upgrade of HCI ports in an HCI cluster, such as illustrated in one or more of FIGS. 1-7.

System 800 houses a system board 802. The system board 802 may include a number of components, including but not limited to a processor 804. The system 800 may further include at least one communication package or chip 806. The communication package 806 is coupled to one or more antennas 842. The system may further include volatile memory (e.g., DRAM) 808, nonvolatile memory (e.g., ROM) 809, a graphics processor 812, a chipset 826, a battery or power source connection 830, a power amplifier 828, a mass storage device (such as a solid state drive or hard disk drive) 810, and one or more ports 840 for wired connection. These components may be connected to the system board 802, mounted to the system board, or combined with any of the other components.

In some embodiments, system 800 further includes an operating system 814, such as illustrated in DRAM 808, wherein the operating system includes support for smart upgrade of HCI clusters. The operating system 814 may include, but is not limited to, an analytics engine 822 and a node sequencing algorithm (NSA) for upgrade operations 824, wherein the operation of the NSA 824 may be as illustrated in FIG. 6B. In some embodiments, alternatively the system 800 further includes firmware 820 to hold instructions related to the system, including but not limited to instructions relating to the analytics engine 822 and the NSA for upgrade operations 824. In various implementations, the system 800 may be, for example, a server, storage element, or other physical element related to a hyper-converged infrastructure. Embodiments may be implemented using one or more memory chips, controllers, CPUs (Central Processing Unit), GPUs (Graphics Processing Units), microchips or integrated circuits interconnected using a motherboard, an application specific integrated circuit (ASIC), a field programmable gate array (FPGA), or other logic. The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations including collecting data regarding operation of a plurality of nodes in a storage infrastructure; performing analysis of the collected data, including analyzing data placement for the plurality of nodes; receiving an request to perform a maintenance operation for the plurality of nodes; generating a sequence of groups of nodes for the maintenance operation based at least in part on the analysis of the collected data, each group including one or more nodes; and performing the maintenance operation for the plurality of nodes according to the sequence of groups of nodes, wherein the maintenance operation includes a power cycle for each of the plurality of nodes.

In some embodiments, a system one or more processors to perform processing of operations; a memory to store data, including data regarding a storage infrastructure, the storage including at least one cluster, the cluster including a plurality of nodes; and firmware to store instructions for at least an analytics engine and node sequencing algorithm, wherein the system is to collect data regarding operation of the plurality of nodes in the storage infrastructure; perform analysis of the collected data, including analyzing data placement for the plurality of nodes; and, upon receiving an request to perform a maintenance operation for the plurality of nodes, generate a sequence of groups of nodes for the maintenance operation based at least in part on the analysis of the collected data, each group including one or more nodes, and perform the maintenance operation for the plurality of nodes according to the sequence of groups of nodes, wherein the maintenance operation includes a power cycle for each of the plurality of nodes.

In some embodiments, a method includes collecting data regarding operation of a plurality of nodes in a hyper-converged infrastructure (HCI); performing analysis of the collected data, including analyzing data placement for the plurality of nodes; receiving an request to perform an upgrade operation for the plurality of nodes; generating a sequence of groups of nodes for the upgrade operation based at least in part on the analysis of the collected data, each group including one or more nodes; and performing the upgrade operation for the plurality of nodes according to the sequence of groups of nodes, wherein the upgrade operation includes a power cycle for each of the plurality of nodes.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A non-transitory computer-readable storage medium comprising instructions that, when executed by one or more processors, cause the one or more processors to:
   collect data regarding an operation of a plurality of nodes in a storage infrastructure;
   perform analysis of the collected data, including analyzing data placement for the plurality of nodes;
   receive a request to perform a maintenance operation for the plurality of nodes;
   generate a sequence of groups of nodes for the maintenance operation based at least in part on the analysis of the collected data, each group of the groups of nodes including one or more nodes, and wherein the groups of nodes comprise a first group of nodes including multiple first nodes, and a second group of nodes including multiple second nodes; and
   perform the maintenance operation for the plurality of nodes according to the sequence of groups of nodes, wherein the maintenance operation includes comprises:
      a power cycle for each node of the plurality of nodes,
      power cycling the multiple first nodes of the first group of nodes together and maintaining the multiple first nodes of the first group of nodes in parallel, and
      power cycling the multiple second nodes of the second group of nodes together and maintaining the multiple second nodes of the second group of nodes in parallel.

2. The non-transitory computer-readable storage medium of claim 1, wherein the analysis of the collected data comprises analyzing data gravity of each node of the plurality of nodes.

3. The non-transitory computer-readable storage medium of claim 1, wherein the plurality of nodes includes a high availability (HA) pair of nodes, and wherein the generating of the sequence of groups of nodes comprises including one node of the HA pair of nodes in the first group of nodes, and including another node of the HA pair of nodes in the second group of nodes.

4. The non-transitory computer-readable storage medium of claim 1, wherein the generating of the sequence of groups of nodes is based at least in part on one or more of:
   a calculation of a node weightage for each node of the plurality of nodes; or
   a hive location for the nodes of the plurality of nodes.

5. The non-transitory computer-readable storage medium of claim 1, further comprising instructions that, when executed by the one or more processors, cause the one or more processors to:
   identify non-mission critical virtual machines that are supported by any of the plurality of nodes; and
   shut down one or more of the identified non-mission critical virtual machines prior to performance of the maintenance operation.

6. The non-transitory computer-readable storage medium of claim 5, further comprising instructions that, when executed by the one or more processors, cause the one or more processors to:
   restart the one or more of the identified non-mission critical virtual machines after performance of one or more power cycles in the maintenance operation.

7. The non-transitory computer-readable storage medium of claim 1, wherein the performing of the maintenance operation comprises performing, according to the sequence of groups of nodes, the maintenance operation for the first group of nodes before performing the maintenance operation for the second group of nodes.

8. A system comprising:
   one or more processors;
   a memory to store data, including data regarding a storage infrastructure, the storage infrastructure comprising a cluster including a plurality of nodes; and
   a non-transitory storage medium storing instructions executable on the one or more processors to:

collect data regarding an operation of the plurality of nodes in the storage infrastructure, perform analysis of the collected data, including analyzing data placement for the plurality of nodes, and in response to receiving a request to perform a maintenance operation for the plurality of nodes:

generate a sequence of groups of nodes for the maintenance operation based at least in part on the analysis of the collected data, each group of the groups of nodes including one or more nodes, and wherein the groups of nodes comprise a first group of nodes including multiple first nodes, and a second group of nodes including multiple second nodes, and perform the maintenance operation for the plurality of nodes according to the sequence of groups of nodes, wherein the maintenance operation comprises a power cycle for each node of the plurality of nodes, power cycling the multiple first nodes of the first group of nodes together and maintaining the multiple first nodes of the first group of nodes in parallel, and power cycling the multiple second nodes of the second group of nodes together and maintaining the multiple second nodes of the second group of nodes in parallel.

9. The system of claim 8, wherein the analysis of the collected data comprises analyzing data gravity of each node of the plurality of nodes.

10. The system of claim 8, wherein the plurality of nodes includes a high availability (HA) pair of nodes, and wherein the generating of the sequence of groups of nodes comprises including one node of the HA pair of nodes in the first group of nodes, and including another node of the HA pair of nodes in the second group of nodes.

11. The system of claim 8, wherein the generating of the sequence of groups of nodes is based at least in part on one or more of:

a calculation of a node weightage for each node of the plurality of nodes; or a hive location for the nodes of the plurality of nodes.

12. The system of claim 8, wherein the instructions are executable on the one or more processors further to:

identify non-mission critical virtual machines that are supported by any of the plurality of nodes; and shut down one or more of the identified non-mission critical virtual machines prior to performance of the maintenance operation.

13. The system of claim 12, wherein the is instructions are executable on the one or more processors further to:

restart the one or more of the identified non-mission critical virtual machines after performance of one or more power cycles in the maintenance operation.

14. The system of claim 8, wherein the performing of the maintenance operation comprises performing, according to the sequence of groups of nodes, the maintenance operation for the first group of nodes before performing the maintenance operation for the second group of nodes.

15. A method of a system comprising a hardware processor, comprising:

collecting data regarding an operation of a plurality of nodes in a hyper-converged infrastructure (HCI);

performing analysis of the collected data, including analyzing data placement for the plurality of nodes;

receiving an request to perform an upgrade operation for the plurality of nodes;

generating a sequence of groups of nodes for the upgrade operation based at least in part on the analysis of the collected data, each group of the groups of nodes including one or more nodes, and wherein the groups of nodes comprise a first group of nodes including multiple first nodes, and a second group of nodes including multiple second nodes; and performing the upgrade operation for the plurality of nodes according to the sequence of groups of nodes, wherein the upgrade operation includes:

a power cycle for each node of the plurality of nodes, power cycling the multiple first nodes of the first group of nodes together and maintaining the multiple first nodes of the first group of nodes in parallel, and power cycling the multiple second nodes of the second group of nodes together and maintaining the multiple second nodes of the second group of nodes in parallel.

16. The method of claim 15, wherein the analysis of the collected data comprises analyzing data gravity of each node of the plurality of nodes.

17. The method of claim 15, wherein the plurality of nodes includes a high availability (HA) pair of nodes, and wherein the generating of the sequence of groups of nodes comprises including one node of the HA pair of nodes in the first group of nodes, and including another node of the HA pair of nodes in the second group of nodes.

18. The method of claim 15, wherein the generating of the sequence of groups of nodes is based at least in part on one or more of:

a calculation of a node weightage for each node of the plurality of nodes; or a hive location for the nodes of the plurality of nodes.

19. The method of claim 15, further comprising:

identifying non-mission critical virtual machines that are supported by any of the plurality of nodes; and shutting down one or more of the identified non-mission critical virtual machines prior to performance of the upgrade operation.

20. The method of claim 19, further comprising:

restarting the one or more of the identified non-mission critical virtual machines after performance of one or more power cycles in the upgrade operation.

\* \* \* \* \*